US008397075B2

(12) United States Patent
Meier et al.

(10) Patent No.: US 8,397,075 B2
(45) Date of Patent: Mar. 12, 2013

(54) METHOD AND APPARATUS FOR ACCESS CONTROL TO INSTALLATION CONTROL SYSTEMS OF WIND ENERGY INSTALLATIONS

(75) Inventors: Stefan Meier, Kiel (DE); Andre Hartung, Schellhorn (DE); Guntram Kunft, Rendsburg (DE)

(73) Assignee: REpower Systems AG, Hamburg (DE)

( * ) Notice: Subject to any disclaimer, the term of this patent is extended or adjusted under 35 U.S.C. 154(b) by 285 days.

(21) Appl. No.: 12/855,505

(22) Filed: Aug. 12, 2010

(65) Prior Publication Data

US 2011/0055584 A1    Mar. 3, 2011

(51) Int. Cl.
*H04L 9/00*    (2006.01)
*H04L 9/32*    (2006.01)

(52) U.S. Cl. ............................ 713/182; 713/183; 726/17

(58) Field of Classification Search .......... 713/182–184, 713/189; 726/2–6, 9, 21, 16–17; 380/44
See application file for complete search history.

(56) References Cited

U.S. PATENT DOCUMENTS

| 3,866,173 A | 2/1975 | Moorman et al. |
| 4,591,967 A * | 5/1986 | Mattes et al. ..................... 700/3 |
| 7,171,467 B2 * | 1/2007 | Carley .......................... 709/224 |
| 2003/0204733 A1 | 10/2003 | Krulce |
| 2007/0245150 A1 | 10/2007 | Lu et al. |

FOREIGN PATENT DOCUMENTS

| EP | 1 519 040 | 3/2005 |
| FR | 2 760 874 | 9/1998 |
| WO | WO-2006/021047 | 3/2006 |
| WO | WO-2008/095866 | 8/2008 |

* cited by examiner

*Primary Examiner* — Hosuk Song
(74) *Attorney, Agent, or Firm* — Morrison & Foerster LLP

(57) ABSTRACT

A method for access control to installation control systems of wind energy installations. The method includes receiving a requested user name and a requested password, wherein authorizations and checking information are coded in the requested password. The method further includes decoding the authorizations and the checking information from the requested password, checking the requested user name on the basis of the decoded checking information, checking the decoded authorizations if the check of the requested user name on the basis of the decoded checking information has a positive result, and allowing access to an installation control system of a wind energy installation when the decoded authorizations are sufficient. A wind energy installation for implementing the method includes an installation control system and a decoding unit.

14 Claims, 3 Drawing Sheets

|  | 31 | | | 32 | | |
|---|---|---|---|---|---|---|
|  | 35 | 36 | 37 | 35 | 36 | 37 |
| 30 | 1-4 | 1-32 | 0;237 | 1-2 | 1-32 | 0;237 |
| 30 | 1 | 1-8 | 0;237 | 1 | 1-2 | 0 |
| 30 | 2-7 | 2;10 | 0;237 | 2-7 | 10 | 237 |
| 30 | 8 | 1 | 0;237 | 8 | 1 | 237 |
| ⋮ | | | | | | |

METHOD AND APPARATUS FOR ACCESS CONTROL TO INSTALLATION CONTROL SYSTEMS OF WIND ENERGY INSTALLATIONS

REFERENCE TO RELATED APPLICATIONS

This application claims the priority of German Patent Application No. 10 2009 037 224.5, filed Aug. 12, 2009, the contents of which are incorporated herein by reference.

FIELD OF THE INVENTION

The invention relates to a method for access control to installation control systems of wind energy installations, and to a wind energy installation which is designed to carry out the method according to the invention.

BACKGROUND OF THE INVENTION

The individual components of a wind energy installation are controlled by an installation control system. The installation control system is in this case generally in the form of a computer unit which can be configured before commissioning and during operation of a wind energy installation. It can therefore always be matched to the latest knowledge relating to optimum operation of a wind energy installation, throughout the entire life of the wind energy installation. Furthermore, the installation control system provides information relating to the operation of the wind energy installation.

In order to prevent any given third party from being able to configure the installation control system of a wind energy installation, access to the installation control system is generally protected by a combination of a user name and password. For this purpose, in the prior art, password lists in the form of a user database are stored in the installation control system, containing the user names and passwords which are authorized for access.

Since an individual data record must be stored in the installation control system for each access-authorized user, according to the prior art, the user database must be updated whenever the access authorization of an individual user changes. However, this is not always possible in a prompt manner, particularly in the case of those wind energy installations which are not connected to a remote data transmission network. A user to be newly added has to wait until the installation control system user database for a wind energy installation has been updated before he is granted access to the installation control system of this wind energy installation. An access authorization which might be required at short notice is impossible with this prior art.

It is also known in the prior art for general passwords to be used for wind energy installations. In this case, all the users in a user group, that is to say a group with specific access authorizations, are assigned a common (general) user name and a common (general) password for all the wind energy installations from one manufacturer. This has the disadvantage that, if the access data becomes known outside the user group, this allows unimpeded access to the installation control system by third parties. Therefore, for security reasons, when an employee who knows the access data leaves, the general user names and general passwords must be changed, and all the users with access authorization must be notified promptly. This involves an enormous amount of administration effort, and involves considerable security risks.

SUMMARY OF THE INVENTION

The invention is based on the object of providing a method for access control to installation control systems of wind energy installations, which does not have the disadvantages known in the prior art, or has them only to a lesser extent. A further object to the invention is to provide a wind energy installation for carrying out the method according to the invention.

Against the background of the prior art mentioned initially, this object is achieved by the features broadly disclosed herein. Advantageous embodiments are described in the detailed disclosure.

The invention accordingly relates to a method for access control to installation control systems of wind energy installations, comprising the following steps:

a) requesting a user name and a password, wherein authorizations and checking information are coded in the password;

b) decoding the authorizations and the checking information from the requested password;

c) checking the requested user name on the basis of the decoded checking information;

if the check of the requested user name on the basis of the decoded checking information has a positive result, then d) checking the decoded authorizations;

when the decoded authorizations are sufficient, then e) allowing access to the installation control system of a wind energy installation.

Steps c) and d) can also be interchanged.

The invention also relates to a wind energy installation comprising an installation control system and a decoding unit which is connected to the installation control system, wherein the installation control system and/or the decoding unit are/is designed to request a user name and a password with authorizations and checking information coded therein, and the decoding unit is designed to decode the coded authorizations and checking information from the requested password, to check the requested user name on the basis of the decoded checking information and to allow access to the installation control system depending on the result of the check of the requested user name on the basis of the decoded checking information and the decoded authorizations.

The method according to the invention makes it possible to control the access of individual users to the installation control system of a wind energy installation solely by allocation of specifically coded passwords. There is no longer any need for a database for the wind energy installation, in which all the user names authorized for access, and the associated passwords, are stored. This completely avoids the effort for updating such databases with positive lists relating to access authorizations. Furthermore, the user is granted immediate access to the wind energy installations within the scope of his authorizations.

The checking information relates to information which proves an association between a requested user name and a requested password with adequate probability. In its decoded form, the checking information coded in the password may be a reproduction of the requested user name. The decoded checking information can easily be compared with the user name in order to decide whether the requested password belongs to the requested user name. However, for example, the checking information may also be a checksum of the user name. It is likewise possible for the authorizations which are coded in the password to be electronically signed with the aid of the user name. The signature can then be coded as checking information in the password, and can be checked using the requested user name. It is also possible for the authorizations which are coded in the password to be electronically encrypted with the aid of the user name. The checking information may then be information which makes it possible to check correct decryption of the authorizations.

It is preferable for the individual functions of the installation control system to be assigned authorization requirements and, when selecting a function of the installation control system, for the decoded authorizations to be checked against the authorization requirements for this function. "Functions of the installation control system" comprise individual setting and configuration options, which can be implemented within the installation control system, for example for the generator, the converter, the pitch controller, etc. However, the functions also include pure information functions which provide a user with information about the operating state of the entire wind energy installation or of individual components of the wind energy installation.

Access control broken down on the basis of functions is achieved by checking the decoded authorizations on an individual case basis against the authorization requirements for individual functions of the installation control system. This therefore makes it possible not only to protect access to the installation control system in the wind energy installation in a general form via the user name and the password, but also to allow access separately to the individual functions of the wind energy installation.

The authorizations preferably comprise a user group, a user level, a wind energy installation access class and/or an expiry date.

By way of example, the user group relates to information concerning the organization to which the user belongs. A first user group can thus be assigned to the employees of the manufacturer of the wind energy installation, while a second user group is assigned to the employees of the manufacturers of individual components of the wind energy installation. A third user group can be provided for the employees of the operator of the wind energy installation, while a fourth user group is provided for employees of service companies.

The user level can show the status of a user within a user group. By way of example, an experienced, technical project manager can be allocated a user level which allows comprehensive access to the installation control system. Less experienced employees are allocated a level which includes only a low level of access rights. Non-technical employees of the manufacturer can, for example, be allocated an authorization level in which all the functions which can change the configuration of the installation control system of the wind energy installation are blocked, and access is allowed, for example, only to information functions.

The wind energy installation access class makes it possible to ensure that users are granted access only to the installation control system of those installations with which they are familiar or which are in their area of influence. The wind energy installation access class can be used to ensure that, for example, employees of a wind energy installation operator are granted access only to the installation control system of their own wind energy installations, but not to those of competitors. A general wind energy installation access class can be provided, which allows access to all wind energy installations, irrespective of their access class association. A general wind energy installation access class such as this can be used for the employees of the manufacturer of the wind energy installation.

The user group, user level and wind energy installation access class can therefore be used to grant an experienced user in the service of the manufacturer of the wind energy installation comprehensive access to the installation control system, while specialists for a specific component of the wind energy installation are granted access only to the capabilities to adjust this specific component. By way of example, employees of the operator of the wind energy installation may be granted exclusively access rights for functions which are required for operation of their own wind energy installations, but not for fundamental configurations of these wind energy installations. An employee of a service company, who has to monitor only the correct operation of the wind energy installation and should notify the operator and/or the manufacturer when faults occur, is granted only access rights which relate to requesting information, but not to the configuration of the installation control system.

The expiry data can be used to determine when a password is no longer valid. The expiry date is preferably formed as a validity period from a specific key date, with the validity period preferably being specified in days or months. The provision of this expiry date ensures that passwords must be renewed regularly, thus reducing, or at least temporally limiting, the probability of unauthorized access by third parties who have achieved knowledge of a password. Furthermore, previously authorized users lose all access authorizations at the latest when the validity period of their password expires, unless a new password is generated for them. For example, this makes it possible to prevent former employees of the manufacturer still having access to the installation control system of the wind energy installations installed by the manufacturer. In contrast to a "password ageing", which is known per se and requires a central time-controlled monitoring file, the password according to the invention bears its expiry date indelibly in it. This not only achieves autonomy, but also improves the manipulation security.

It is furthermore preferable for the authorizations provided, the user name to be coded in the password and/or the password itself to be encrypted during or after coding, and to be decrypted before or during decoding. This makes it possible to further enhance the degree of security of the password, and of the combination of the user name and password. Appropriate encryption makes it more difficult to draw conclusions about the actual coding method. A symmetrical or an asymmetric encryption method can be used for this encryption and decryption, in which the encryption process is carried out on the basis of a freely selectable key. It is preferable if a first key is used for encryption and/or decryption of the authorizations provided of the user name to be coded and/or of the password of a first user group, and a second key is used for a second user group. Since a third party cannot see from the user name or the password the user group to which the user associated with the user name belongs, he can also not obtain any information as to which encryption or decryption method, and which key, has been used for this purpose. The capabilities to draw conclusions relating to the coding method used are further exacerbated, thus improving the security.

It is possible to check the entered and/or decoded user name against a list of blocked user names, and to refuse the access to the installation control system if the entered and/or decoded user name is found on the list with blocked user names. The provision of a list such as this for the installation control system makes it possible to nevertheless refuse access to the installation control system of a wind energy installation by users whose validity duration coded in the password has not yet expired. If the user were to have a password with an unlimited validity time period or the validity period should fundamentally not be decoded in the password, then this is one possible way to refuse individual users access to installation control systems of wind energy installations without having to change the coding or encryption of the passwords for all users.

It is preferable for the password to be generated by a coding unit which is separate from the installation control system. The risk of manipulation is reduced by the coding unit for coding the user name and the authorizations in a password being implemented separately from the wind energy installation and its installation control system. Only decoding is still carried out at the wind energy installation, which does not allow any conclusions, or only minor conclusions, to be drawn with respect to the actual coding, depending on the coding method used.

One coding and decoding method for coding authorizations and checking information provided into a password will be described by way of example in the following text.

The authorizations provided for each user are in numerical form, as a user group, user level, wind energy installation access class and expiry date. The value for the user group may be in a range from 0 to 15, that for the user level in a range from 0 to 31, and that for the wind energy installation access class in a range from 0 to 4095. The expiry date is formed as the number of months from a base date, and can assume a value range from 1 to 600 (corresponding to 50 years). The expiry date can also be formed as the number of days from a base date, in which case the value range can be chosen to be correspondingly greater, for example from 1 to 17 800.

All the information relating to the authorizations provided is coded into an integer number K. If g is the user group to be coded with 16 possible values, l is the user level to be coded with 32 possible values, d is the validity date to be coded in months with—in this example—600 possible values and z is the wind energy installation access class to be coded with 4096 values, then the integer number K can be determined as follows:

$$K = g + 16 \times l + 16 \times 32 \times d + 16 \times 32 \times 601 \times z.$$

By way of example, the initial values g=4, l=10, d=3, z=200 result in the integer number:

K=61544100.

In binary notation, this number is as follows:

K(bin)=11101010110001011010100100.

The integer number K relates to the useful data in the password which will be generated later.

In order to protect the password against manipulation, a message authentication code (MAC) is calculated, and is attached to the binary notation of the integer number K. For this purpose, the freely selectable user name—likewise in binary notation—is attached to the integer number K in binary notation and, with the aid of a predetermined key, this is used to calculate a MAC:

K(bin)=11101010110001011010100100
User name(bin)=1111111100111111111
MAC(11101010110001011010100100 1111111100111 11111)=11010110100101010010101011110101001001010 101000101011111111 010100101011111100101010100101010100101010010 1 0100101000101 001010101.

The initial part of the MAC—in this case the first 24 bits—is attached to the integer number K, resulting in the combined number P:

P=11101010110001011010100100 110101101001010100101010.

The number P in binary notation can be used to check whether the number P belongs to a requested user name. For this purpose, a MAC is once again calculated from the first part of the combined number P, to be more precise the useful data and the number K, and the requested user name, and the first 24 bits of the newly calculated MAC are compared with the MAC stored in the combined number P. If the newly calculated MAC matches the MAC stored in the combined number, this ensures that the user name and the password, as well as the authorizations contained therein, are associated.

In order to ensure that it is not possible to see from a password what useful data it contains, the useful data component of the combined number P is encrypted. A stream cipher, such as RC4, can be used for this purpose, which is initialized using an additional key, the binary coding of the user name and the MAC as calculated above. This step results in a secure password with authorizations and checking information coded therein, in binary coded form.

A simplified password for the user can be generated from the password produced in this way in binary coded form, by conversion to alphanumeric characters, and this simplified password can also be entered easily via a keyboard. For example, it is possible to convert the binary coding of the password to a character sequence using the digits 0 to 9 and the letters a to z. In this case, it is possible to omit certain letters, for example the letter "l". This provides additional security against so-called "brute-force" attacks, in which all the possible passwords are simply tried out automatically in series, because all password attempts with a blocked letter are themselves revealed as an unauthorized access attempt. Furthermore, this makes it possible to reduce the risk of confusion between certain symbols, for example between the letter "l" and the digit "1".

In order to counteract the risk of the password being forgotten or entered incorrectly, the users can also each be allocated an electronic legitimation medium, such as a signature card or a USB stick with a password stored in it. To simplify the authentication process, the password is then checked by this legitimation medium. In order to achieve protection against theft of the legitimation medium, it is expedient for this type of legitimation to take place in addition to a password request, in which case the password can be shorter and the further information, such as the access class, can be called up by the legitimation medium.

A decoding unit carries out the above actions in the opposite sequence in order to decode the password and in order to check the association with the requested user name. First of all, the password is converted to its corresponding binary notation, and the useful data is decrypted. The MAC is then calculated from the useful data and the entered user name and—as stated above—is compared with the MAC contained in the combined number. If they match, the access rights are decoded from the useful data.

If the wind energy installation access class which users authorized for access must have is stored in the installation control system, then access to the installation control system is permitted only after a match has been found between the wind energy installation access classes stored at the wind energy installation and the access class decoded from the password. Furthermore, it is possible to store in the installation control system, for each function, which user groups are intended to have access, with what user level, to individual functions of the installation control system. A check is likewise carried out to determine whether the password has expired yet. This is done by determining the number of months to the current date from a base date, and comparing this with the expiry date contained in the useful data. A user is not granted access to the installation control system, or to a specific function of the installation control system, unless the authorizations from the password meet all the preconditions.

It is self-evident that the method according to the invention is not only suitable for autonomous access control to the wind energy installation without use of a central server, but alternatively or additionally can also be carried out using a central user database. Furthermore, it is expedient to check the presence of a functional connection to a central user database and, if present, to alternatively or additionally carry out the check of the user name and/or authorizations on the basis of the central user database. This allows the advantages of access control by means of a central database to be linked to the operational security of an autonomous system.

The wind energy installation according to the invention is suitable for carrying out the method according to the invention. Reference is therefore made to the above explanation.

BRIEF DESCRIPTION OF THE DRAWINGS

The invention will now be described, by way of example, using advantageous embodiments and with reference to the attached drawings, in which:

FIG. 3 shows a schematic illustration of a database, with the authorization requirements for individual functions of an installation control system of a wind energy installation.

DETAILED DESCRIPTION OF THE INVENTION

Figure 1:
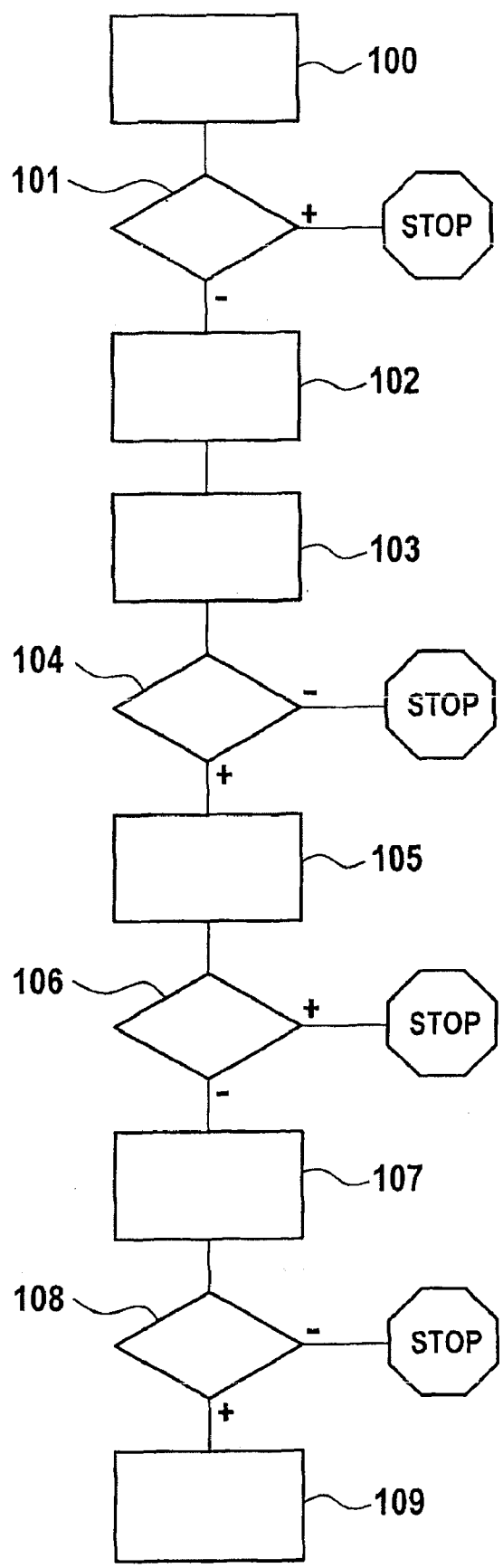
FIG. 1 shows a flowchart of a method according to the invention.

FIG. 1 shows a flowchart of a method according to the invention.

Figure 2:
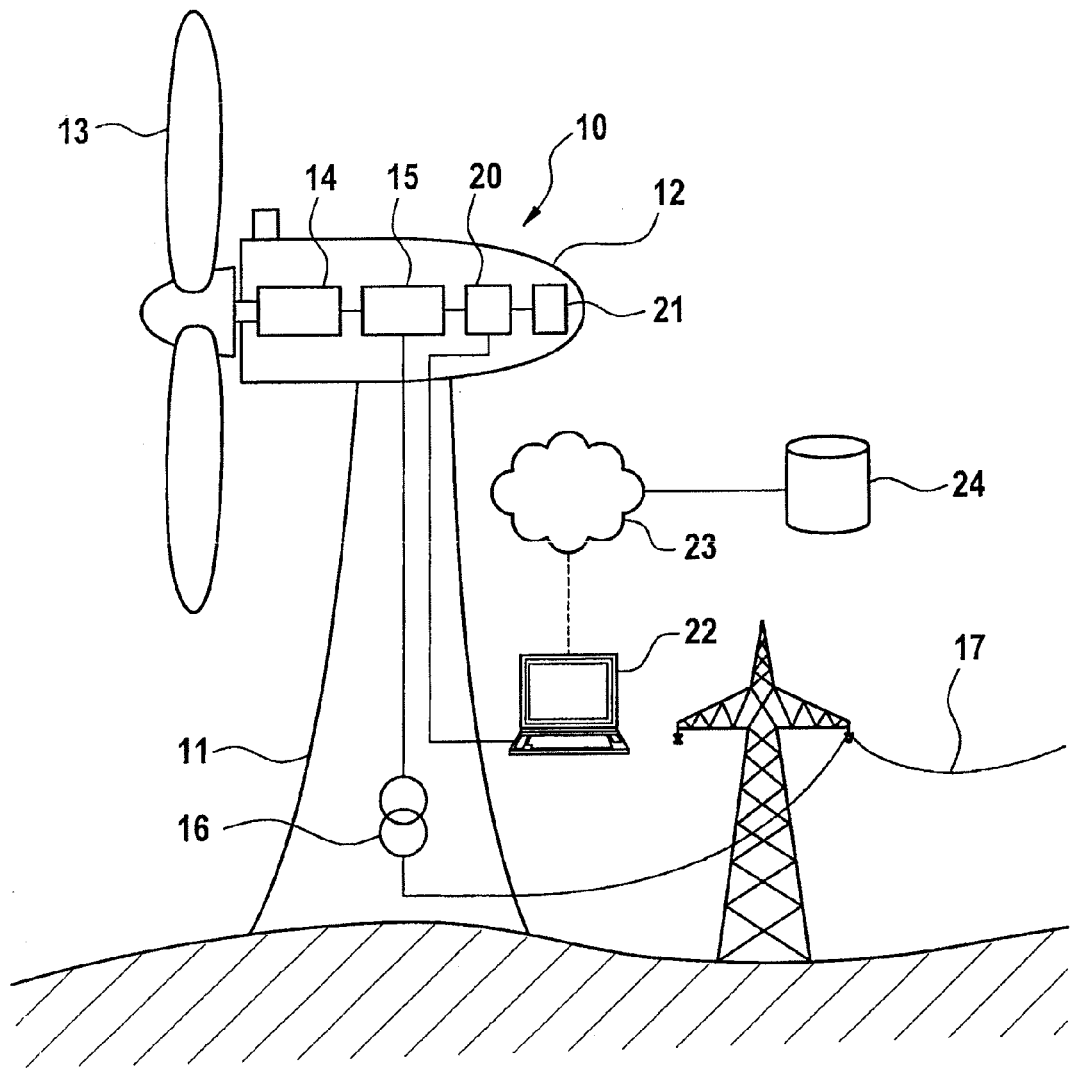
FIG. 2 shows a wind energy installation according to the invention for carrying out the method according to the invention.

In step 100, a user name and a password with authorizations and checking information decoded therein are requested before access is granted to the installation control system 20 of a wind energy installation 10 (cf. FIG. 2).

A check is carried out in a second step 101 to determine whether the requested user name is contained in a list with blocked user names. If this is the case, the method is terminated, and the access to the installation control system 20 of a wind energy installation 10 is refused.

If the requested user name is not in the list with the blocked user names, a check is carried out—after the password or the authorizations contained therein have been decrypted, if necessary, in a step 102—to determine whether the requested password actually belongs to the requested user name. This is done using the checking information contained in the password. The checking information may be a signature which has been generated from authorizations coded into the password, and from the associated user name. In step 103, a signature is then created from the authorizations decoded from the password and from the requested user name, and this signature is compared with the checking information. If the signature created does not match the checking information (step 104), the method is terminated, and the access to the installation control system 20 of a wind energy installation 10 is refused.

If the result of the check in step 104 is positive, the validity of the password is checked. An expiry date coded as an authorization in the password is used to check the validity of the password. The expiry date represents the number of months from a specific key date, within which the password is valid. The number of months between the current date and the key date is determined (step 105), and this number of months is then (step 106) compared with the number of months originating from the password, which determine the expiry date. If the current number of months from the base date is greater than the number stored in the password, then the password is considered to have expired, and access to the installation control system 20 is refused.

Finally, a check is carried out in step 107 to determine whether the authorizations from the requested password do or do not allow access to the installation control system 20 (step 108). In this case, it is possible to refuse access to the installation control system 20 in general, or else only to refuse access to individual functions of the installation control system 20. Otherwise, access is allowed (step 109).

In order to convert wind energy to electrical energy, the wind energy installation 10 shown in FIG. 2 has a rotor 13 which is attached to a pod 12, which is mounted on a tower 11 such that it can rotate, and the rotor 13 drives an asynchronous generator 14. The electrical power produced by the generator 14 is converted via a converter 15 and a transformer 16 such that it can be fed into a high-voltage or medium-voltage grid 17. The conversion is carried out in particular with respect to voltage amplitude, frequency shift and phase shift.

In order to control the wind energy installation 10, an installation control system 20 is provided, and is connected via control lines that are not illustrated here to individual components of the wind energy installation. The individual components of the wind energy installation are controlled via the installation control system 20.

The installation control system 20 has a plurality of functions, by means of which settings can be made in order to control the wind energy installation 10. These functions also include those which simply produce information relating to the operating state of the wind energy installation, and have no direct influence on the control of the wind energy installation 10.

The installation control system is connected to a decoding unit 21 and a terminal 22, via which a user can make inputs. The terminal 22 is connected via an optional connection (shown by dashed lines) to the Internet 23 and, via it, to a central server 24.

Before a user is granted access to the individual functions of the installation control system 20, he is asked via the terminal for a user name and a password. Authorizations and checking information are coded in the password. The coded authorizations relate to a user group, user level, wind energy installation access class and expiry date of the password.

After the user name and the password have been entered, the decoding unit 21 first of all checks the association between these two inputs. During this process, a check is carried out to determine whether the checking information coded in the password matches the requested user name. This can also be done, for example, by the authorizations coded in the password being signed with the user name, in which case the checking information represents the signature, and the signature is checked using the requested user name.

Instead of a signature, encryption can also be carried out. It is possible for the password and/or the authorizations to be signed and/or encrypted.

If the result of the association check of the requested user name and password is positive, the authorizations provided are decoded from the password. An access authorization is stored for each function of the installation control system 20 in the installation control system, subdivided into read access and write access. A corresponding database is sketched in FIG. 3.

A decision is made for each function 30 of the installation control system 20 as to which user group 35, user level 36, wind energy installation access class 37 must have the authorizations of a user in order for the latter to be granted read access 31 and/or write access 32. For this purpose, corresponding value ranges of the above-mentioned parameters 35-37 are stored for each function 30, for read access 31 and for write access 32. The user is granted access to the individual functions of read access 31 and/or write access 32 only if the authorizations from the password of the user meet all the preconditions relating to the user group 35, user level 36 and wind energy installation access class 37.

Whether access is in the end granted to him also depends on whether his password is still valid. The expiry date coded in the password is used to check the validity of the password. The expiry date represents the number of months from a specific key date, during which the password is valid. The decoding unit 21 determines the number of months between the current date and the key date, and compares this number of months with the number of months originating from the password, which define the expiry date. If the current number of months from the base date is greater than the number stored in the password, then the password is considered to have expired, and access is refused.

If an active connection exists via the Internet 23, the above-mentioned checks in the course of access control can be partially or completely carried out by accessing the central server 24. The advantages of central access administration can therefore be linked to the advantages of autonomous control, in terms of reliability and failure of components.

The invention claimed is:

1. A method for access control to installation control systems of wind energy installations, comprising:
   receiving a requested user name and a requested password, wherein authorizations and checking information are coded in the requested password;
   decoding the authorizations and the checking information from the requested password;
   checking the requested user name on the basis of the decoded checking information;
   checking the decoded authorizations if the check of the requested user name on the basis of the decoded checking information has a positive result; and
   allowing access to an installation control system of a wind energy installation when the decoded authorizations are sufficient.

2. The method of claim 1, wherein each function of the installation control system is assigned authorization requirements and, when selecting a function of the installation control system, the decoded authorizations are checked against the authorization requirements for this function.

3. The method of claim 1, wherein the authorizations comprise at least one of a user group, a user level, a wind energy installation access class, and an expiry date.

4. The method of claim 3, wherein the expiry date is formed as a validity period from a key date.

5. The method of claim 4, wherein the validity period is formed in days or months.

6. The method of claim 1, wherein at least one of the authorizations and the password is encrypted during or after coding and is decrypted before or during decoding.

7. The method of claim 6, wherein a symmetrical or asymmetric encryption method is used for encryption and decryption.

8. The method of claim 6, wherein a first key is used for at least one of encryption and decryption of the authorizations provided, of the password of a first user group, or of both, and a second key or a second encryption method is used for a second user group.

9. The method of claim 1, wherein access to the installation control system is refused if the requested user name is found on a list of blocked user names.

10. The method of claim 1, wherein the password is generated by a coding unit separate from the installation control system.

11. The method of claim 1, wherein at least a portion of the password is requested by a user-allocated legitimation medium.

12. The method of claim 11, wherein the user-allocated legitimation medium is a signature card or a USB stick.

13. The method of claim 1, further comprising checking whether a functional connection to a central user database exists and, if so, the check of the user name, authorizations, or both, is alternatively or additionally carried out on the basis of the central user database.

14. A wind energy installation comprising:
   an installation control system; and
   a decoding unit connected to the installation control system,
   wherein at least one of the installation control system and the decoding unit is configured to receive a requested user name and a requested password with authorizations and checking information coded therein, and
   wherein the decoding unit is configured to decode the coded authorizations and checking information from the requested password, to check the requested user name on the basis of the decoded checking information, and to allow access to the installation control system depending on the result of the check of the requested user name on the basis of the decoded checking information and the decoded authorizations.

* * * * *

UNITED STATES PATENT AND TRADEMARK OFFICE
CERTIFICATE OF CORRECTION

PATENT NO. : 8,397,075 B2
APPLICATION NO. : 12/855505
DATED : March 12, 2013
INVENTOR(S) : Stefan Meier et al.

Page 1 of 1

It is certified that error appears in the above-identified patent and that said Letters Patent is hereby corrected as shown below:

On the Title page, item (30) Foreign Application Priority Data has been omitted, please add the following information:

--Aug. 12, 2009 (DE)............10 2009 037 224.5--

Signed and Sealed this
Fourth Day of June, 2013

Teresa Stanek Rea
*Acting Director of the United States Patent and Trademark Office*